United States Patent
Goodman et al.

(10) Patent No.: US 8,657,255 B2
(45) Date of Patent: Feb. 25, 2014

(54) AIRCRAFT VALVE ASSEMBLIES INCLUDING CLAMP-SPECIFIC BAULKING TAB ARRAYS AND METHODS FOR THE MANUFACTURE THEREOF

(75) Inventors: Craig M. Goodman, Chandler, AZ (US); Dori Marshall, Mesa, AZ (US); Dan E. Hitzler, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 940 days.

(21) Appl. No.: 12/756,839

(22) Filed: Apr. 8, 2010

(65) Prior Publication Data

US 2011/0248203 A1     Oct. 13, 2011

(51) Int. Cl.
    *F16K 51/00*     (2006.01)

(52) U.S. Cl.
    USPC ........... 251/146; 285/407; 285/408; 285/410; 285/411

(58) Field of Classification Search
    USPC .......... 251/146, 367–368, 266; 285/406–408, 285/410–415, 420, 367–368; 292/256.6, 292/256.65, 265.67
    See application file for complete search history.

(56) References Cited

U.S. PATENT DOCUMENTS

| | | | | |
|---|---|---|---|---|
| 909,131 A * | 1/1909 | Antic | ....................... | 285/148.14 |
| 1,818,493 A * | 8/1931 | McWane | ....................... | 285/368 |
| 2,214,381 A * | 9/1940 | Rastetter | ....................... | 285/411 |
| 2,439,024 A | 4/1948 | Ruebel | | |
| 2,934,084 A * | 4/1960 | Adams | ....................... | 137/527.4 |
| 3,141,686 A * | 7/1964 | Smith et al. | ....................... | 277/608 |
| 4,191,410 A * | 3/1980 | Voituriez et al. | ....................... | 285/367 |
| 4,360,086 A * | 11/1982 | Bond et al. | ....................... | 188/343 |
| 4,568,115 A | 2/1986 | Zimmerly | | |
| 5,037,141 A * | 8/1991 | Jardine | ....................... | 285/148.26 |
| 5,201,550 A * | 4/1993 | Burkit | ....................... | 285/109 |
| 5,352,061 A * | 10/1994 | Robinson | ....................... | 403/338 |
| 5,908,210 A * | 6/1999 | Fetzer | ....................... | 285/24 |
| 6,022,454 A * | 2/2000 | Fetzer | ....................... | 202/242 |
| 6,267,417 B1 * | 7/2001 | Fan | ....................... | 285/330 |
| 6,423,188 B1 * | 7/2002 | Fetzer | ....................... | 202/242 |
| 6,702,338 B2 * | 3/2004 | Vanasse | ....................... | 285/407 |
| 6,709,021 B2 * | 3/2004 | Duncan et al. | ....................... | 285/109 |
| 6,832,786 B2 * | 12/2004 | Duncan et al. | ....................... | 285/23 |
| 7,458,619 B2 * | 12/2008 | Cassel et al. | ....................... | 285/420 |
| 7,490,871 B2 * | 2/2009 | Avram et al. | ....................... | 285/420 |
| 7,552,949 B2 * | 6/2009 | Riordan et al. | ....................... | 285/403 |
| 7,832,776 B2 * | 11/2010 | Cassel et al. | ....................... | 285/420 |
| 2012/0125453 A1 * | 5/2012 | Murray | ....................... | 137/511 |

* cited by examiner

*Primary Examiner* — John K Fristoe, Jr.
*Assistant Examiner* — Marina Tietjen
(74) *Attorney, Agent, or Firm* — Ingrassia Fisher & Lorenz, P.C.

(57) ABSTRACT

Embodiments of an aircraft valve assembly are provided for use in conjunction with a selected type of clamp having multiple segments separated by a predetermined gap spacing. In one embodiment, the aircraft valve assembly includes a flowbody having a ported end portion and a flow passage in which a valve element is movably mounted. An array of baulking tabs is mounted around the ported end portion at predetermined intervals corresponding to the predetermined gap spacing to substantially limit the type of clamps installable around the ported end portion to the selected type of clamp.

14 Claims, 3 Drawing Sheets

# US 8,657,255 B2

AIRCRAFT VALVE ASSEMBLIES INCLUDING CLAMP-SPECIFIC BAULKING TAB ARRAYS AND METHODS FOR THE MANUFACTURE THEREOF

TECHNICAL FIELD

The following disclosure relates generally to aircraft valve assemblies and, more particularly, to embodiments of an aircraft valve assembly including a flanged flowbody and a baulking tab array that physically prevents the installation of one or more undesired types of clamps around the flowbody flange.

BACKGROUND

Aircraft valve assemblies commonly include flowbodies that are formed (e.g., cast and subsequently machined) to include at least one radial flange that can be mounted to a mating flange provided on a neighboring duct member or other neighboring flowbody. An annular clamp (commonly referred to as a "V-band clamp") having multiple hinged segments and a V-shaped inner geometry, as taken in cross-section, is often utilized to secure the flowbody's radial flange to the neighboring flowbody flange and thereby form a flange-to-flange interface. The number of segments included within the V-band clamp typically varies in conjunction with the duty rating of the V-band clamp. In general, a light duty V-band clamp typically includes two arcuate segments, while a heavy duty V-band clamp typically includes three or more arcuate segments.

In many instances, an aircraft valve assembly may conduct highly pressurized, highly heated air during operation of the aircraft. For example, the flowbodies of high pressure valve assemblies and manifold pressure valve assemblies often conduct heated, pressurized air bled from the compressor section of a gas turbine engine. To minimize leakage across the flange-to-flange interface, it is desirable to ensure that the radial flanges of such aircraft valve assemblies are secured to neighboring flanges utilizing heavy duty (e.g., three segment) V-band clamps. However, as conventionally designed and implemented, aircraft valve assemblies typically do not include any structural features that prevent or interfere with the installation of a lighter duty (e.g., two segment) V-band clamp around the valve assembly flange. A lighter duty clamp may consequently be mistakenly installed around the valve assembly flange, which may result in excessive leakage across the flange-to-flange interface and a corresponding decrease in engine efficiency during flight of the aircraft.

There thus exists an ongoing need to provide embodiments of an aircraft valve assembly (or other flowbody assembly) including one or more structural features that physically prevent the installation of one or more undesired types of clamps around the valve assembly flange, while permitting the installation of a selected type of clamp around the valve assembly flange. It would be desirable if embodiments of such an aircraft valve assembly were relatively straightforward to implement and amenable to fabrication utilizing conventional manufacturing processes. It would also be desirable to provide embodiments of a method for manufacturing such an aircraft valve assembly. Other desirable features and characteristics of the present invention will become apparent from the subsequent Detailed Description and the appended Claims, taken in conjunction with the accompanying Drawings and this Background.

BRIEF SUMMARY

Embodiments of an aircraft valve assembly are provided for use in conjunction with a selected type of clamp having multiple segments separated by a predetermined gap spacing. In one embodiment, the aircraft valve assembly includes a flowbody having a ported end portion and a flow passage in which a valve element is movably mounted. An array of baulking tabs is mounted around the ported end portion at predetermined intervals corresponding to the predetermined gap spacing to substantially limit the type of clamps installable around the ported end portion to the selected type of clamp.

Also provided are embodiments of a flowbody assembly configured to be utilized in conjunction with a selected type of clamp having multiple segments separated by a predetermined gap spacing. In one embodiment, the flowbody assembly includes a ported end portion having an annular neck and a radial flange coupled to the annular neck. A plurality of radial projections extends from the annular neck, and a plurality of baulking tabs is mounted to the plurality of radial projections. The plurality of baulking tabs is circumferentially dispersed around the ported end portion at predetermined intervals corresponding to the predetermined gap spacing to substantially limit the type of clamps installable around the ported end portion to the selected type of clamp.

Further provided are embodiments of a method for manufacturing an aircraft valve assembly for use in conjunction with a selected type of clamp having multiple segments separated by a predetermined gap spacing. In one embodiment, the method includes the steps of forming a flowbody to include a ported end portion and a flow passage, mounting a valve element within the flow passage, and disposing a plurality of baulking tabs around the ported end portion at predetermined circumferential intervals corresponding to the predetermined gap spacing to substantially limit the type of clamps installable around the ported end portion to the selected type of clamp.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description. As appearing herein, the term "array" is utilized to denote a set of at least two baulking tabs that are positioned at predetermined circumferential locations around the ported end portion of an aircraft valve assembly or other flowbody assembly. While primarily described below in conjunction with a particular type of clamp (i.e., a multi-segment V-band clamp), embodiments of the aircraft valve assembly (or other flowbody assembly) can be utilized with any type of clamp configured to be disposed at least partially around a radial flange and having a plurality of circumferentially-spaced gaps in which the baulking tabs may be received.

Figure 1:
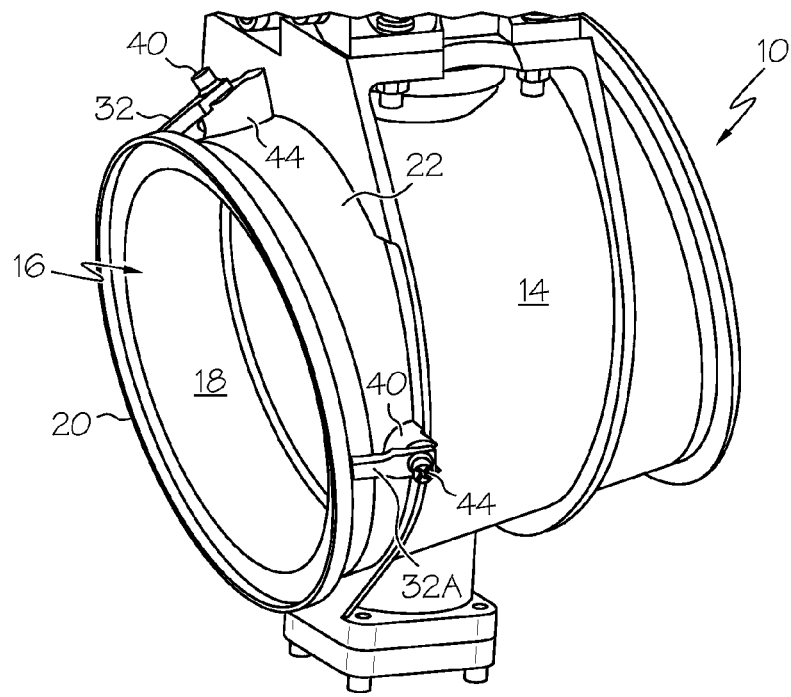
FIGS. 1 and 2 are isometric views of an aircraft valve assembly including a clamp-specific baulking tab array illustrated prior to and after installation of a V-band clamp, respectively, in accordance with an exemplary embodiment.
Figure 2:
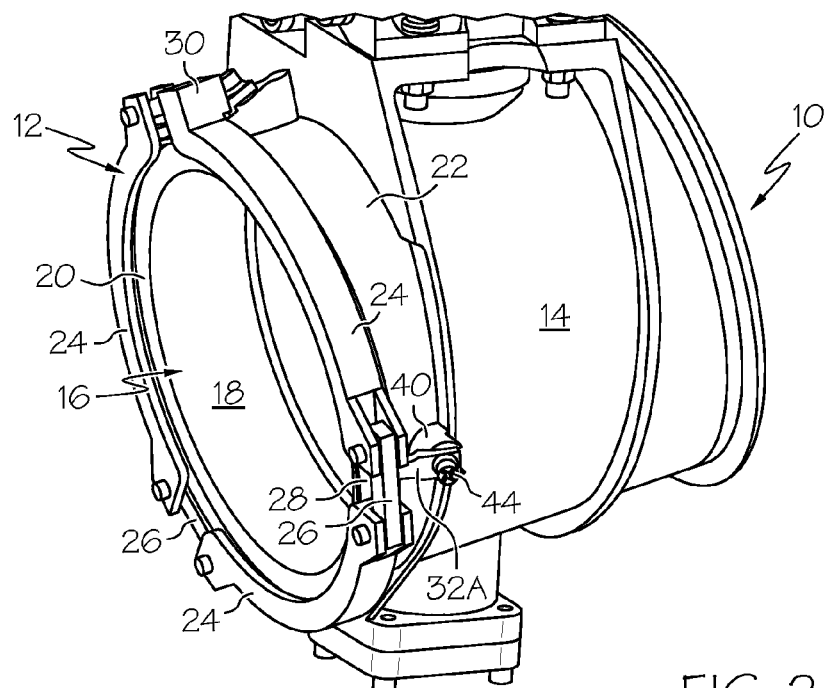

FIGS. 1 and 2 are isometric views of an aircraft valve assembly 10 illustrated prior to and after the installation of a V-band clamp 12, respectively, in accordance with an exemplary embodiment. In this particular example, aircraft valve assembly 10 assumes the form of a manifold pressure valve assembly of the type commonly deployed onboard an aircraft and fluidly coupled to a gas turbine engine. This notwithstanding, it is emphasized that additional embodiments of the present invention can comprise various other types of flowbody assemblies, whether or not such assemblies include a valve element and are intended for deployment aboard an aircraft. It is noted, however, that embodiments of the present invention are especially well-suited for usage within high pressure, high temperature airborne applications wherein it is desired to ensure that a particular type of clamp (e.g., a heavy duty clamp having three or more segments) is utilized to secure an aircraft valve assembly to a neighboring flowbody (e.g., a duct member) to minimize leakage across a flange-to-flange interface, as described more fully below.

With reference to FIGS. 1 and 2, aircraft valve assembly 10 includes a flowbody 14 having a first ported end portion 16 and a flow passage 18 therethrough. Ported end portion 16 includes an annular neck 22, which extends longitudinally from the main body of flowbody 14, and a radial flange 20, which is joined to (e.g., integrally formed around) annual neck 22. When aircraft valve assembly 10 is installed onboard an aircraft, radial flange 20 is clamped to a mating radial flange provided on a neighboring flowbody, such as a neighboring duct member (not shown). As indicated in FIG. 2, V-band clamp 12 can be disposed around radial flange 20 and the flange of the neighboring flowbody (again, not shown in FIG. 2) to secure aircraft valve assembly 10 to the neighboring flowbody. In the exemplary embodiment illustrated in FIG. 2, V-band clamp 12 assumes the form of a heavy duty V-band clamp including three arcuate segments, which are hingedly joined together by hinge members 26 and which are spaced apart at predetermined intervals by circumferential gaps 28 (one of which is identified in FIG. 2). A latch member 30 is joined to one of segments 24 (the leftmost segment in the illustrated orientation). After V-band clamp 12 is fitted around radial flange 20 and an adjacent radial flange (not shown), latch member 30 is moved into the closed position shown in FIG. 2. A T-bold or other threaded fastener included within latch member 30 (not shown in FIG. 2 for clarity) can then be turned to tighten V-band clamp 12 around flange 20 of ported end portion 16 and thereby secure aircraft valve assembly 10 to the neighboring flowbody.

As described in the previous section entitled "Background," there exists an ongoing need to provide embodiments of an aircraft valve assembly that includes one or more structural features that physically prevent the installation of one or more undesired clamp types around the valve assembly flange, while permitting the installation of a desired type of clamp around the valve assembly flange. In the exemplary case of aircraft valve assembly 10, specifically, it is desirable to generally prevent the installation of light duty, two segment clamps around radial flange 20, while permitting the installation of heavy duty, three segment clamps, such as V-band clamp 12 (FIG. 2). Therefore, to generally limit the type of clamps installable around ported end portion 16 to one or more selected types of clamps, an array of baulking tabs 32 is mounted around ported end portion 16. As will be described more fully below, baulking tabs 32 are strategically positioned or dispersed around ported end portion 16 at predetermined circumferential locations corresponding to the gap spacing of the selected type of clamp. Referring specifically to the exemplary embodiment illustrated in FIG. 2, three baulking tabs 32 are mounted around ported end portion 16 at substantially evenly spaced intervals (e.g., approximately 120° intervals) corresponding to the gap spacing of V-band clamp 12 and other heavy duty clamps having three arcuate segments of substantially equal length. This example notwithstanding, the number and circumferential spacing of baulking tabs 32 will inevitably vary amongst different embodiments in conjunction with the predetermined circumferential gap spacing of the selected type of clamp. For example, in an embodiment wherein it is desired to limit the types of clamps installable around radial flange 20 to a heavier duty V-band clamp having four segments of substantially equivalent lengths separated by circumferential gaps, four baulking tabs 32 may be mounted around ported end portion at approximately 90° intervals. Alternatively, in a further embodiment wherein it is desired to limit the types of clamps installable around radial flange 20 to a lighter duty V-band clamp having two segments of substantially equivalent lengths, two baulking tabs 32 may be mounted around ported end portion at approximately 180° intervals.

Figure 3:
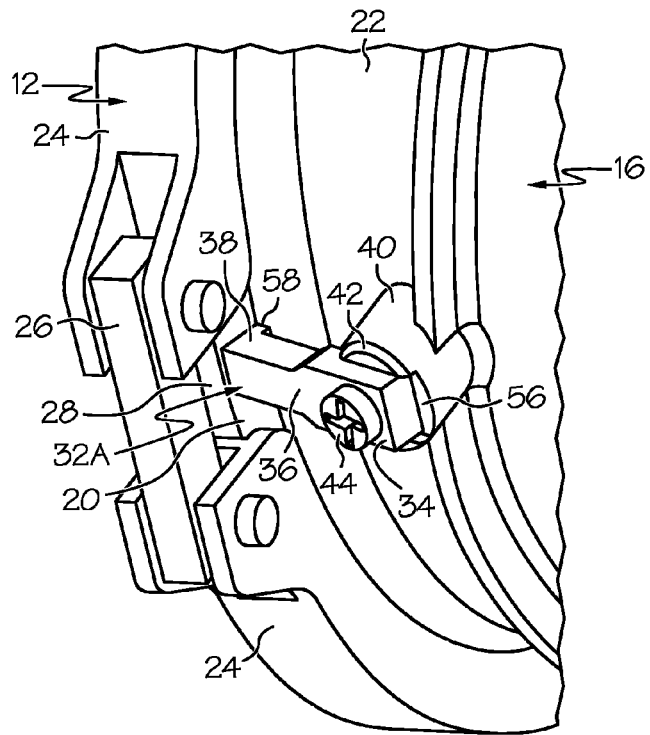
FIG. 3 is an isometric view of a portion of the aircraft valve assembly and the V-band clamp illustrating the manner in which one of the baulking tabs included within the baulking tab array may be received within a circumferential gap of the V-band clamp.
Figure 4:
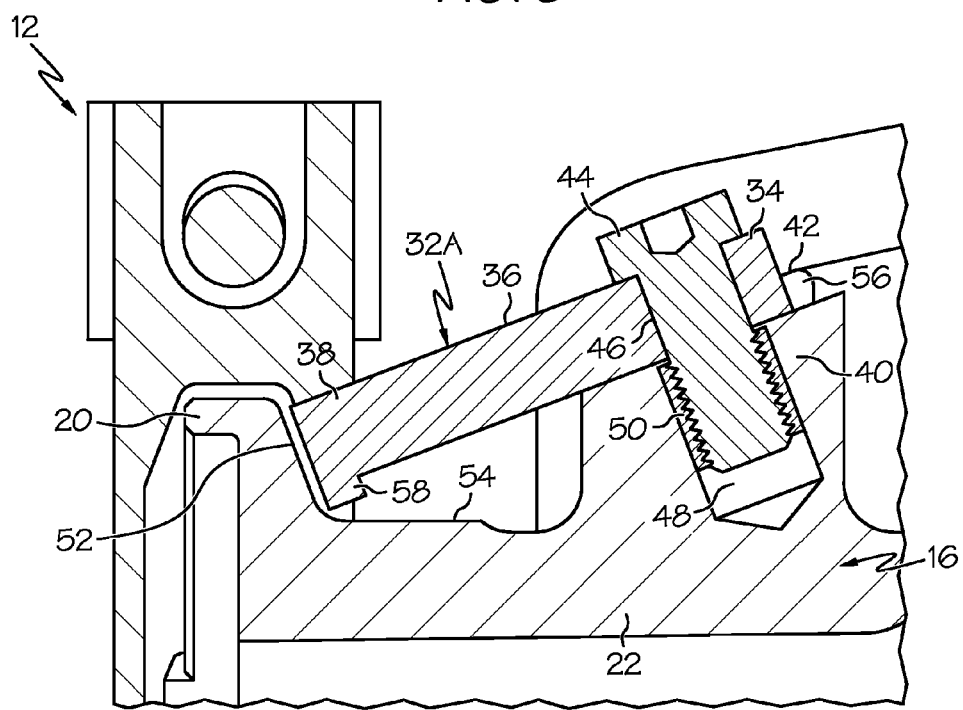
FIG. 4 is a cross-sectional view of a portion of the aircraft valve assembly and the V-band clamp, taken along the longitudinal axis of the aircraft valve assembly and through the baulking tab shown in FIG. 3.
Figure 5:
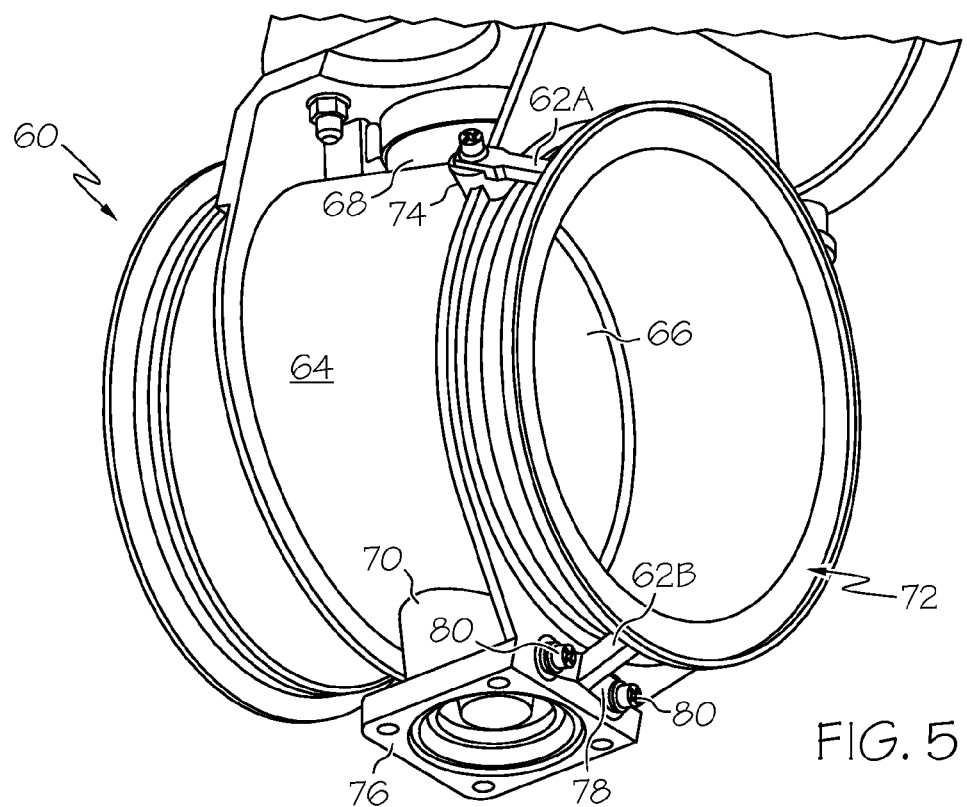
FIG. 5 is an isometric view of an aircraft valve assembly including a clamp-specific baulking tab array in accordance with a further exemplary embodiment.

FIG. 3 is an isometric view of a portion of aircraft valve assembly 10 and V-band clamp 12 illustrating the manner in which a baulking tab 32(A) included within baulking tab array 32 may be received within a circumferential gap 28 of V-band clamp 12 when clamp 12 is installed over radial flange 20. FIG. 4 is a cross-sectional view of a portion of aircraft valve assembly 10 and V-band clamp 12, taken along the longitudinal axis of flowbody 14 and through baulking tab 32(A). Although only one baulking tab (i.e., baulking tab 32(A)) is shown in FIGS. 3 and 4 and described below, the baulking tabs included within baulking tab array 32 are substantially identical in the exemplary embodiment illustrated in FIGS. 1-4. Thus, the following description applies equally to each of the baulking tabs included within array 32. It is, however, noted that the baulking tabs included within baulking tab array 32 need not be identical in all embodiments of aircraft valve assembly 10; e.g., in certain embodiments, one or more of the baulking tabs in array 32 may assume alternative structural forms (e.g., that of a T-shaped bracket) as described more fully below in conjunction with FIGS. 5 and 6.

As identified in FIGS. 3 and 4, baulking tab 32(A) includes a first end portion 34, an elongated intermediate portion 36, and a second end portion 38 substantially opposite first end portion 34. First end portion 34 of baulking tab 32(A) is mounted to a radial projection 40, which extends outwardly from annular neck 22 of ported end portion 16. In the exemplary embodiment illustrated in FIGS. 1-4, radial projection 40 assumes the form of a cylindrical boss having an outer seating surface 42 to which first end portion 34 of baulking tab 32(A) is affixed. First end portion 34 can be affixed to outer seating surface 42 of radial projection 40 utilizing a number of different joinder techniques (e.g., welding and soldering) and/or attachment means (e.g., lock wire). However, as indicated in FIG. 4, first end portion 34 of baulking tab 32(A) is preferably attached to radial projection 40 utilizing a bolt 44 or other fastener, which extends through an opening 46 provided in end portion 34 of tab 32(A) and into a bore 48 provided in radial projection 40. As generically illustrated in FIG. 4, a threaded insert 50 is disposed within bore 48 and threadably engages bolt 44 to secure bolt 44, and therefore baulking tab 32(A), to radial projection 40. As aircraft valve assembly 10 is intended to be utilized within a high vibratory environment, threaded insert 50 is preferably of the "locking" variety to deter the gradual loosening of bolt 44. In addition, one or more tamper resistant features may be employed to deter manual removal of bolt 44. For example, bolt 44 may include a tamper-resistant head, the body of bolt 44 may be secured within bore 48 utilizing lock wire, or bolt 44 and/or baulking tab 32(A) may be further affixed to radial projection 40 utilizing tack welding.

As shown most clearly in FIG. 4, baulking tab 32(A) extends from radial projection 40 toward radial flange 20. Second end portion 38 of baulking tab 32(A) terminates adjacent, but preferably does not contact, the inner annular face of radial flange 20 (identified in FIG. 4 by reference numeral "52"). An axial clearance is thus provided between end portion 38 of baulking tab 32(A) and inner annular face 52 of radial flange 20 to prevent abrasion when aircraft valve assembly 10 is deployed within high vibratory environments. Notably, the elongated intermediate portion 36 of baulking tab 32(A) enables radial projection 40 to be longitudinally spaced apart from radial flange 20, which provides additional room between radial projection 40 and radial flange 20 to facilitate machining (e.g., turning) of an outer annular surface 54 of neck 22 during manufacture of aircraft valve assembly 10, as described more fully below.

As is conventional in the context of flanged flowbodies, inner annular face 52 of radial flange 20 forms an acute angle (e.g., an angle of 20°) relative to a line normal to the longitudinal axis of flowbody 14. In a preferred embodiment, and as indicated in FIG. 4, the longitudinal axis of baulking tab 32(A) is substantially orthogonal to the inner annular face 52 of radial flange 20. Similarly, outer seating surface 42 is angled with respect to the longitudinal axis of the flowbody 14 (e.g., the radial height of radial projection 40 decreases with increasing proximity to radial flange 20), which increases the ease with which grinding or other machining tools can access outer seating surface 42 during fabrication of aircraft valve assembly 10. Outer seating surface 42 is conveniently formed to include an anti-rotation feature that engages baulking tab 32(A) to deter the rotation thereof. For example, a longitudinal slot 56 can be formed in outer seating surface 42, which mating receives end portion 34 when baulking tab 32(A) is affixed to radial projection 40. As indicated in FIGS. 3 and 4, the sidewalls of longitudinal slot 56 contact the sidewalls of baulking tab 32(A) to prevent the rotation thereof. In alternative embodiments, the anti-rotational feature may comprise a different type of a raised structural feature (e.g., a step), which likewise abuts a sidewall of baulking tab 32(A) to prevent the rotation thereof.

As noted above, end portion 38 of baulking tab 32(A) preferably terminates adjacent, but does not contact, inner annular face 52 of radial flange 20 (identified in FIG. 4). At the same time, it is desirable to impart end portion 38 with a sufficient radial thickness to contact an outer surface of ported end portion 16 prior to full engagement between V-band clamp 12 and radial flange 20 should a technical attempt to install an incorrect clamp (e.g., a light duty, two part V-band clamp) over ported end portion 16 by first positioning the V-band clamp above baulking tab 32(A) and subsequently tightening the clamp over tab 32(A). Thus, as shown most clearly in FIG. 4, end portion 38 of baulking tab 32(A) may be formed to include an inner radial tooth 58, which will abut an outer surface of ported end portion 16 proximate the interface between radial flange 20 and annual neck 22 prior to full engagement between V-band clamp 12 and radial flange 20 to deter installation of an undesired type of clamp over ported end portion 16. By providing end portion 38 of baulking tab 32(A) with an inner radial tooth (as opposed to uniformly increasing the thickness of end portion 38 and intermediate portion 36 of tab 32(A)), the overall weight of baulking tab 32(A) is reduced. In addition, in embodiments wherein end portion 34 is required to have a minimum width to satisfy design parameters, weight savings can also be achieved by decreasing or tapering the width of intermediate portion 36 of baulking tab 32(A) with increasing proximity to end portion 38, as indicated in FIG. 3.

The foregoing has thus provided an exemplary embodiment of an aircraft valve assembly including an array of baulking tabs that physically prevent the installation of one or more undesired types of clamps (e.g., lighter duty, two segment V-band clamps) around the valve assembly flange, while permitting the installation of at least one selected type of clamp (e.g., heavier duty, three segment V-band clamps, such as V-band clamp 12 shown in FIGS. 2-4) around the valve assembly flange. Notably, in the above-described exemplary embodiment, the circumferential positioning of the baulking tabs included within baulking tab array 32 also ensures that the selected type of clamp is installed around the valve assembly flange in or near a desired clocking position. To further limit the clocking positions in which the selected type of clamp can be installed, the width of baulking tab 32(A) and/or the width of another baulking tab within array 32 can be increased to be slightly less than the width of the corresponding circumferential gap of the selected type of clamp.

Figure 6:
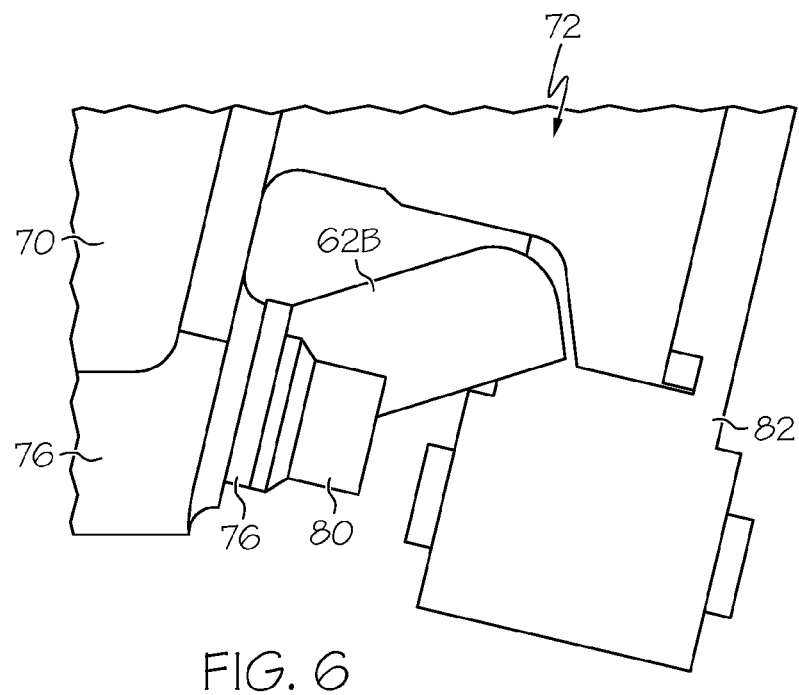
FIG. 6 is an isometric view of the aircraft valve assembly shown in FIG. 5 illustrating a T-shaped baulking tab included within the baulking tab array and received within the circumferential gap of a V-band clamp.

In the foregoing example, each baulking tab comprised a bar-shaped body mounted to a radial projection, which assumed the form of a boss extending outward from the annular neck of the assembly's ported end portion. This example notwithstanding, the baulking tabs and the radial projections to which the baulking tabs are mounted will assume various other shapes and geometries in alternative embodiments. Further emphasizing this point, FIG. 6 is an isometric view of an aircraft valve assembly 60 including a baulking tab array 62 in accordance with a further exemplary embodiment. In this particular example, aircraft valve assembly 60 assumes the form of a high pressure valve assembly configured to be fluidly coupled to a gas turbine engine deployed aboard an aircraft. Aircraft valve assembly 60 includes a flowbody 64 and a valve element 66 (e.g., a butterfly plate), which is movably mounted within flowbody 64. More specifically, valve element 66 is affixed to a shaft (hidden from view in FIG. 6), which extends through the flow passage of flowbody 64. A first end of the shaft is received within an annulus provided within an upper mounting structure 68 of aircraft valve assembly 60, and the opposing end of the shaft is received within an annulus provided within a lower mounting structure 70 of aircraft valve assembly 60 (commonly referred to as a "chimney"). Due to the structural design of flowbody 64, insufficient room is provided around the ported end portion of flowbody 64 (identified in FIG. 6 by reference numeral "72") to form three circumferentially-spaced bosses. Thus, two radial projections 74 are formed as bosses extending outwardly from ported end portion 72 (only one of which can be seen in FIG. 5), and two baulking tabs 62(A) included within array 62 are affixed to bosses utilizing bolts or other such fasteners, as previously described. The remaining baulking tab 62(B) in array 62 is affixed to the sidewall of a flange 76 provided around lower mounting structure 70 (lower mounting structure 70 is thus considered a "radial projection" in this particular example). More specifically, baulking tab 62(B) assumes the form of a T-shaped bracket having a mounting base 78, which is secured to the sidewall of flange 76 utilizing, for example, first and second fasteners 80.

FIG. 6 is a side view of a lower portion of aircraft valve assembly 60, baulking tab 62(B), and a V-band clamp 82 installed around ported end portion 72 of aircraft valve assembly 60. As can be seen in FIG. 6, the body of baulking tab 62(B) extends longitudinally from mounting base 78 toward, but terminates prior to contacting, the flange of ported end portion 72. When V-band clamp 82 is installed around ported end portion 72, baulking tab 62(B) is received within a circumferential gap of a V-band clamp 82. Baulking tab 62(B) thus cooperates with baulking tabs 62(A) to physically prevent the installation of one or more undesired types of clamps (e.g., a lighter duty, two segment V-band clamp) around the flange of ported end portion 72, while permitting the installation of heavy duty, three segment clamps, such as V-band clamp 82, around ported end portion 72. In this manner, baulking tab array 62 helps to ensure that the appropriate type of V-band clamp 82 is installed around ported end portion 72 and the flange of a neighboring flowbody (not shown) to decrease the likelihood of leakage across the flange-to-flange interface during operation of aircraft valve assembly 60.

The foregoing has thus provided multiple exemplary embodiments of an aircraft valve assembly including an array of baulking tabs that physically prevent the installation of one or more undesired types of clamps (e.g., lighter duty, two segment V-band clamps) around the valve assembly flange, while permitting the installation of at least one selected type of clamp (e.g., heavier duty, three segment V-band clamps) around the valve assembly flange. Advantageously, the above-described exemplary aircraft valve assemblies are relatively straightforward to implement and are amenable to fabrication utilizing conventional manufacturing processes. For example, referring once again to aircraft valve assembly 10 shown in FIGS. 1-4, aircraft valve assembly 10 can be manufactured by first forming flowbody 14 to include ported end portion 16 and subsequently disposing baulking tabs 32 around ported end portion 16 at predetermined circumferential intervals corresponding to the predetermined gap spacing of a selected type of clamp (e.g., V-band clamp 12 shown in FIGS. 2-4). During the formation of flowbody 14, ported end portion 16 may first be cast (along with the remainder of flowbody 14) to include one or more bosses or other radial projections 40. Ported end portion 16 may then be machined, as appropriate; e.g., outer annular portion 54 of neck 22 (identified in FIG. 4) may be turned, and an anti-rotation feature (e.g., longitudinal slot 56) may be cut into seating surface 42 of each radial projection 40. After machining of ported end portion 16 and, more generally, flowbody 14, each baulking tab in baulking tab array 32 may then be affixed to a different radial projection 40 utilizing, for example, a bolt 44 or other such fastener. Finally, additional steps are preformed to complete fabrication of aircraft valve assembly 10; e.g., a valve element (e.g., a butterfly plate, such as butterfly plate 66 shown in FIG. 5) is movably mounted within flow passage 18 of flowbody 14.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:

1. An aircraft valve assembly, comprising:
    a flowbody having a ported end portion and a flow passage therethrough, the ported end portion comprising:
        a radial flange;
        an annular neck fixedly coupled to the radial flange; and
        a plurality of bosses extending from the annular neck;
    a valve element movably mounted within the flow passage;
    an array of baulking tabs mounted around the annular neck of the ported end portion at predetermined intervals, extending toward the radial flange, and each attached to a different one of the plurality of bosses; and
    a clamp including multiple hinged segments separated by circumferential gaps having a predetermined spacing corresponding to the circumferential positioning of the array of baulking tabs such that, when the clamp is installed around the ported end portion, each baulking tab from the array of baulking tabs is received within one of the circumferential gaps separating the hinged segments of the clamp.

2. An aircraft valve assembly according to claim 1 wherein each of the plurality of bosses includes an outer seating surface to which a first end portion of one of the array of baulking tabs is attached.

3. An aircraft valve assembly according to claim 2 wherein each of the array of baulking tabs comprises a second end portion substantially opposite the first end portion and terminating adjacent the radial flange.

4. An aircraft valve assembly according to claim 2 wherein the outer seating surface forms an acute angle with the longitudinal axis of the aircraft valve assembly.

5. An aircraft valve assembly according to claim 2 wherein each of the plurality of bosses comprises an anti-rotation feature engaging one of the array of baulking tabs to prevent rotation thereof.

6. An aircraft valve assembly according to claim 5 wherein the anti-rotation feature comprises a longitudinal slot formed in the outer seating surface.

7. An aircraft valve assembly according to claim 1 wherein the clamp comprises a V-band clamp.

8. An aircraft valve assembly according to claim 1 wherein the array of baulking tabs are spaced about the ported end portion at substantially regular intervals.

9. An aircraft valve assembly, comprising:
    a flowbody having a ported end portion and a flow passage therethrough, the ported end portion comprising:
        a radial flange;
        an annular neck fixedly coupled to the radial flange; and
        a plurality of radial projections extending from the annular neck;
    a valve element movably mounted within the flow passage;
    an array of baulking tabs mounted around the annular neck of the ported end portion at predetermined intervals, extending toward the radial flange, and each attached to a different one of the plurality of radial projections;
    a clamp including multiple hinged segments separated by circumferential gaps having a predetermined spacing corresponding to the circumferential positioning of the array of baulking tabs such that, when the clamp is installed around the ported end portion, each baulking tab from the array of baulking tabs is received within one of the circumferential gaps separating the hinged segments of the clamp; and
a plurality of threaded fasteners coupling the array of baulking tabs to the plurality of radial projections.

10. An aircraft valve assembly according to claim 9 further comprising a plurality of locking threaded inserts disposed within the plurality of radial projections, each of the plurality of locking threaded inserts receiving a different one of the plurality of threaded fasteners therein.

11. An aircraft valve assembly according to claim 9 wherein at least one of the array of baulking tabs comprises a substantially T-shaped bracket.

12. A flowbody assembly, comprising:
a ported end portion having an annular neck and a radial flange coupled to the annular neck;
a plurality of radial projections extending from the annular neck; and
a plurality of baulking tabs circumferentially dispersed around the ported end portion at predetermined intervals such that the plurality of baulking tabs allows the installation of a selected type of clamp over the ported end portion, the selected type of clamp having multiple hinged segments separated by a predetermined gap spacing, while the plurality of baulking tabs physically blocks the installation of clamps having multiple hinged segments, but lacking the predetermined gap spacing;
wherein each baulking tab in the plurality of baulking tabs has a first end portion affixed to one of the plurality of radial projections, an elongated intermediate portion which extends axially from the first end portion toward the radial flange, and a second end portion that terminates adjacent the radial flange while being offset therefrom by an axial clearance.

13. A flowbody assembly according to claim 12 wherein each radial projection in the plurality of radial projections includes a longitudinal slot formed therein, the first end portion of one of the plurality of baulking tabs received within the longitudinal slot.

14. A flowbody assembly according to claim 12 wherein each baulking tab in the plurality of baulking tabs comprises a radial tooth extending from the second end portion.

\* \* \* \* \*